United States Patent
Dorschel (10) Patent No.: US 9,594,380 B2
(45) Date of Patent: Mar. 14, 2017

(54) PATH RECORDING AND NAVIGATION

(76) Inventor: Travis Dorschel, Issaquah, WA (US)

( * ) Notice: Subject to any disclaimer, the term of this patent is extended or adjusted under 35 U.S.C. 154(b) by 170 days.

(21) Appl. No.: 13/589,111

(22) Filed: Aug. 18, 2012

(65) Prior Publication Data

US 2013/0238130 A1  Sep. 12, 2013

Related U.S. Application Data (60) Provisional application No. 61/607,369, filed on Mar. 6, 2012.

(51) Int. Cl.
  *G06F 7/00* (2006.01)
  *G05D 1/02* (2006.01)
  *A01D 34/00* (2006.01)

(52) U.S. Cl.
  CPC ......... *G05D 1/0274* (2013.01); *A01D 34/008* (2013.01); *G05D 1/0221* (2013.01); *G05D 1/0246* (2013.01); *G05D 2201/0208* (2013.01)

(58) Field of Classification Search
  CPC ...... B25J 9/1697; B25J 19/023; B25J 9/1692; G05D 1/0246
  USPC ....................................................... 700/259
  See application file for complete search history.

(56) References Cited

U.S. PATENT DOCUMENTS

| | | | | |
|---|---|---|---|---|
| 5,204,814 A * | 4/1993 | Noonan | ............... | A01D 34/008 180/168 |
| 7,953,526 B2 * | 5/2011 | Durkos | ............... | G05D 1/0246 340/286.02 |
| 8,086,419 B2 * | 12/2011 | Goncalves | ............ | G01C 21/12 701/450 |
| 2002/0156556 A1 * | 10/2002 | Ruffner | ............... | A01B 69/008 701/23 |
| 2007/0262897 A1 * | 11/2007 | De Mersseman | ......... | G01S 7/03 342/70 |
| 2008/0109126 A1 * | 5/2008 | Sandin | ................... | G05D 1/028 701/23 |
| 2009/0128488 A1 * | 5/2009 | Ang | ...................... | G06F 3/0317 345/158 |
| 2009/0228166 A1 * | 9/2009 | Durkos | ............... | G05D 1/0219 701/26 |
| 2009/0254218 A1 * | 10/2009 | Sandin | ................... | G05D 1/028 700/258 |
| 2010/0280754 A1 * | 11/2010 | Goncalves | ............. | G01C 21/12 701/532 |
| 2010/0299016 A1 * | 11/2010 | Benzler | ............... | G05D 1/0246 701/26 |
| 2011/0046784 A1 * | 2/2011 | Anderson | ............ | G05D 1/0251 700/259 |
| 2011/0153072 A1 * | 6/2011 | Anderson | ................ | G01S 1/70 700/245 |
| 2011/0153136 A1 * | 6/2011 | Anderson | ............ | G05D 1/0219 701/25 |
| 2011/0153338 A1 * | 6/2011 | Anderson | ................ | G01S 1/68 705/1.1 |
| 2013/0054134 A1 * | 2/2013 | Wang | ................. | G01C 21/3484 701/424 |

OTHER PUBLICATIONS

NPL: Interim Guideline and Examples for 101; Date:N/A.*

* cited by examiner

*Primary Examiner* — Ian Jen
(74) *Attorney, Agent, or Firm* — Seattle Patent Group LLC; James Haugen (57) ABSTRACT

The instant application discloses, among other things, path recording and automatic navigation that may be applicable to various applications, including, but not limited to, lawn mowing.

18 Claims, 8 Drawing Sheets

PATH RECORDING AND NAVIGATION

FIELD

This disclosure relates to path recording and navigation.

BACKGROUND

Automation has been used to simplify life in many areas. Examples include the use of robotic lawnmowers and vacuum cleaners that operate with limited human intervention.

These devices often use a form of perimeter marking, and use random paths to accomplish their tasks. The perimeter marking often involves the use of beacons, IR LEDs, electrified wires, metallic strips, GPS, radio frequency tags, radio transmitters or receivers, ultrasonic sensors, or other external markers.

SUMMARY

The following presents a simplified summary of the disclosure in order to provide a basic understanding to the reader. This summary is not an extensive overview of the disclosure and it does not identify key/critical elements of the subject matter or delineate the scope of the claimed subject matter. Its sole purpose is to present some concepts disclosed herein in a simplified form as a prelude to the more detailed description that is presented later.

The instant application discloses, among other things, path recording and navigation that may be applicable to various applications, including, but not limited to, lawn mowing.

In one embodiment, a user would guide a Robotic Lawnmower implementing Path Recording and Navigation through an appropriate path to mow a lawn. The lawnmower would learn the route based upon recognizing cues from the environment, such as structures, trees, or other specific details, using image processing. The lawnmower could then automatically reproduce the path it has learned for future autonomous operation.

In another embodiment, a user would guide the robotic lawnmower around the perimeter of an area to be mowed, and the lawnmower may calculate an optimal path for mowing the enclosed area.

DESCRIPTION OF THE INVENTION

The detailed description provided below in connection with the appended drawings is intended as a description of the present examples and is not intended to represent the only forms in which the present example may be constructed or utilized. The description sets forth the functions of the example and the sequence of steps for constructing and operating the example, however any alternative implementation which carries out the same or equivalent functions is intended to fall within the scope of the present invention.

The instant application discloses, among other things, path recording and navigation that may be applicable to various applications. While the embodiments used herein are described in the context of using a robotic lawnmower, the techniques have other applications as well, including but not limited to vacuuming, floor refinishing, and painting of surfaces.

Figure 1:
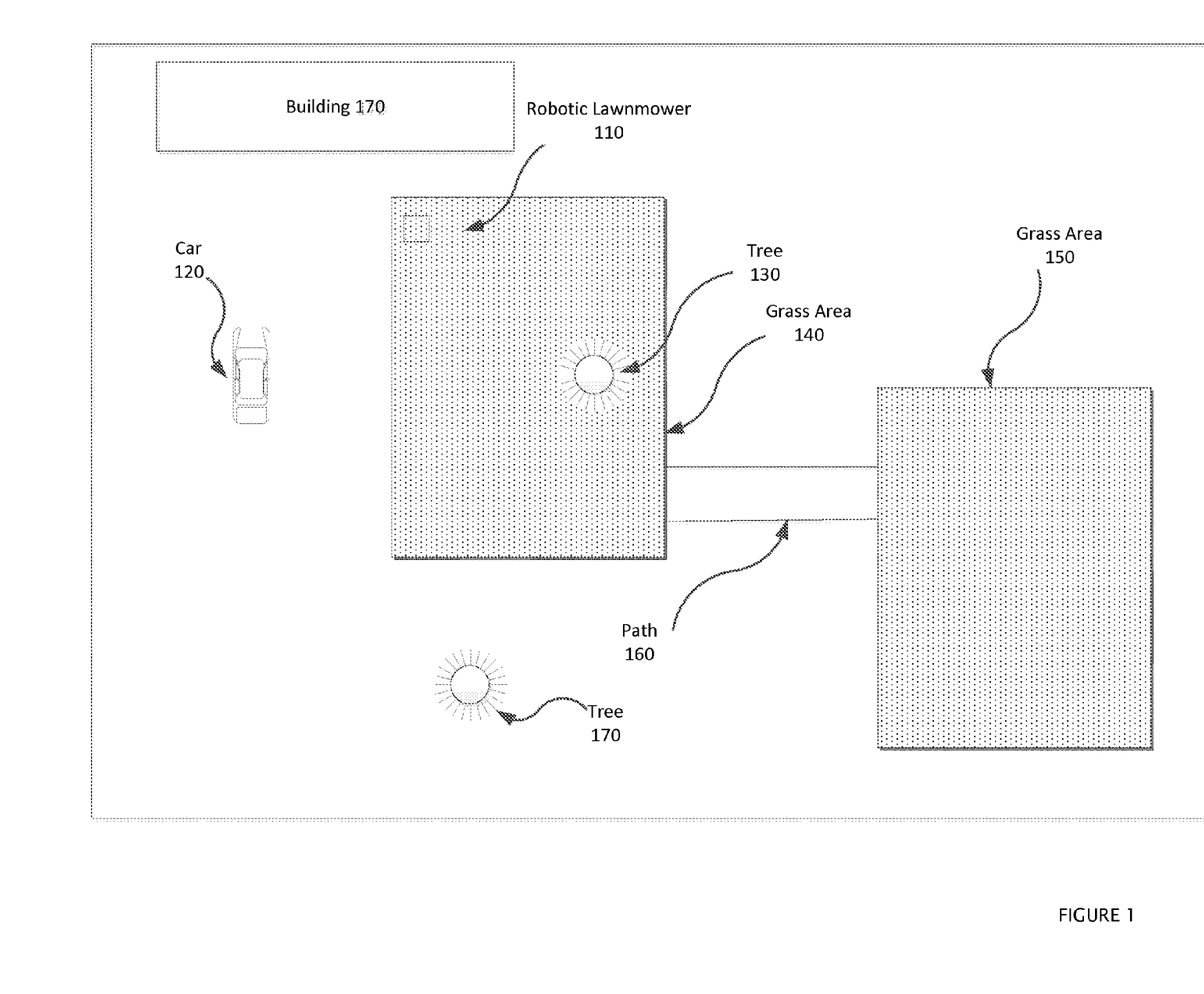
FIG. 1 is an example of a yard map which may be used with path recording and navigation.

FIG. 1 is an example of a yard map which may be used with path recording and navigation. A Robotic Lawnmower 110 implementing Path Recording and Navigation may be placed on Grass Area 140. A user may then mow grass area 140 in a manner which the user wishes the Robotic Lawnmower 110 to learn. As the user mows the area, Robotic Lawnmower 110 may use image recognition to determine its location, allowing it to later reproduce the same path independently. Robotic Lawnmower 110 may use environmental features such as Building 170, Tree 130, Tree 170, and Car 120 to determine its location. In one embodiment, Robotic Lawnmower 110 may use mirrors and lenses to provide a panoramic 360° image of an area surrounding it, using the image to identify its location with respect to environmental features in and around the area. Robotic Lawnmower 110 may use image sensors, inertial sensors, GPS, or other any other types of sensors to determine its location in three dimensions, as well as its orientation.

Robotic Lawnmower 110 may update and remember its location and orientation several times a second during a learning session, and may then repeat the path for future mowings autonomously.

Car 120 may not always be in the same place, and Robotic Lawnmower 110 may update the environmental features used for location determination over time based on relative locations of the environmental features.

Robotic Lawnmower 110 may use a computer and various environmental sensors to perform image recognition and to determine its location and orientation. Robotic Lawnmower 110 may also use various types of cutting techniques, including, but not limited to, rotating blades, reciprocal knives, or a reel blade system.

In some embodiments, the user may record both mowing and non-mowing locations. For example, Path 160 may contain pebbles, and the user may not want Robotic Lawnmower 110 to mow in that area, but travel over it to Grass Area 150, and continue mowing in that area. The mowing blade may be disengaged for that section. In other embodiments, Robotic Lawnmower 110 may record what cutting heights to use in various places, areas to fertilize or water, or other metadata. One skilled in the art will recognize that Robotic Lawnmower 110 may perform many activities that may be recorded and replayed.

Figure 2:
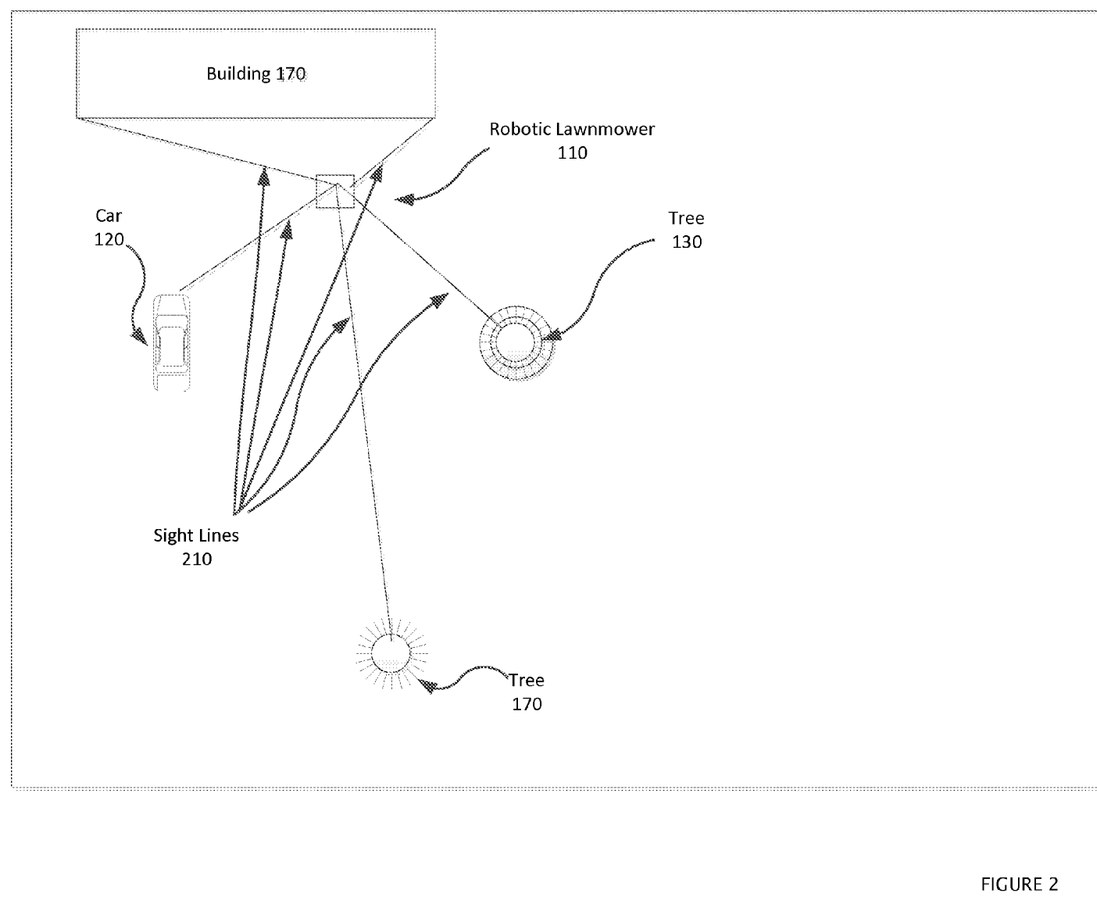
FIG. 2 is an example of environmental features which may be used with path recording and navigation.

FIG. 2 is an example of environmental features which may be used with path recording and navigation. In one embodiment, Robotic Lawnmower 110 may determine its location by calculating angles between Sight Lines 210 to various environmental features, such as corners of building 170, Trees 130, 170, and Car 120. Robotic Lawnmower 110 may also use techniques to determine its location when not all environmental features are available, so that if, for example, Car 120 is not there, the remaining environmental features may be sufficient for Robotic Lawnmower 110 to determine its location.

Figure 3:
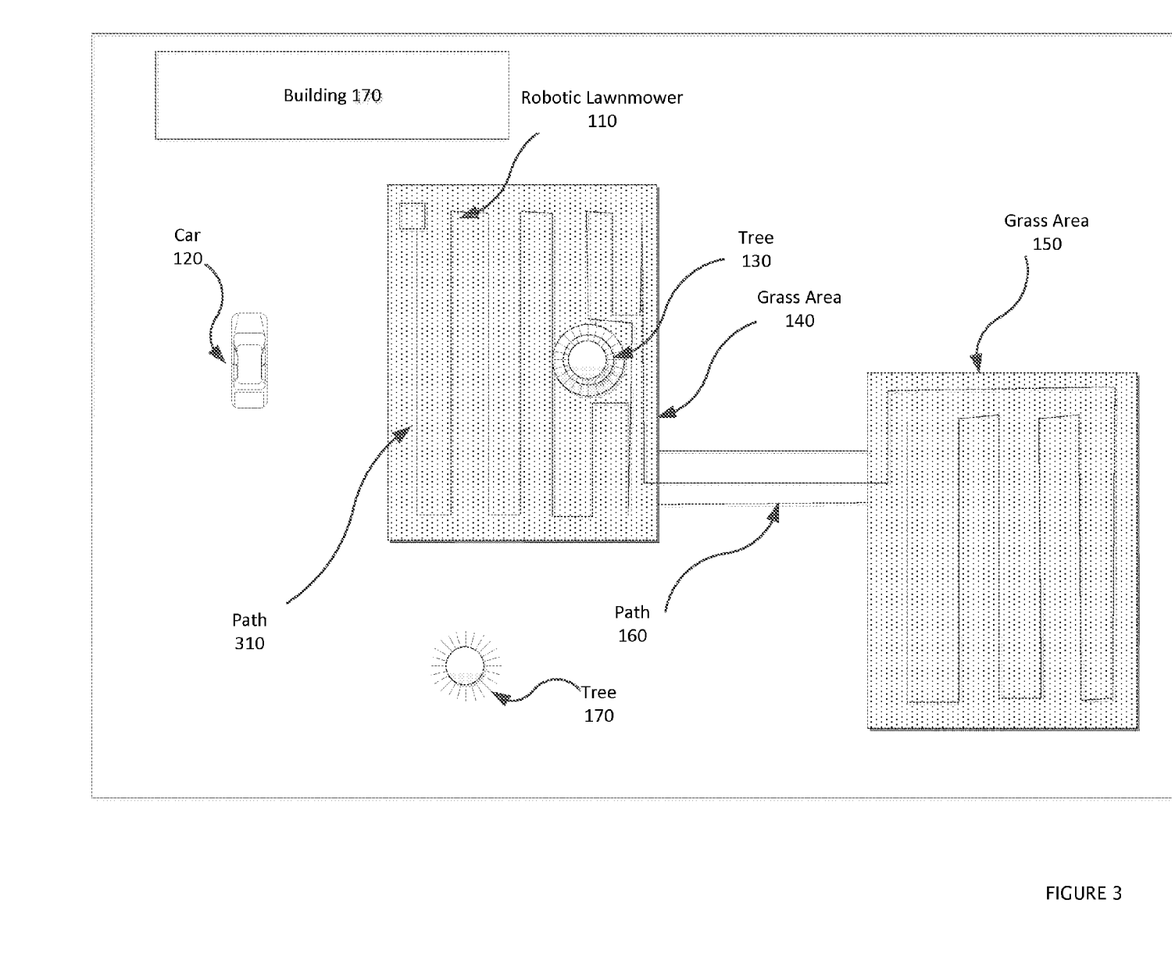
FIG. 3 is an example of a path that a user may produce using one embodiment of path recording and navigation.

FIG. 3 is an example of a Path 310 that a user may produce using one embodiment of path recording and navigation. In this example, a user may use Robotic Lawnmower 110 to mow Grass Area 140 and Grass Area 150, while turning off a blade system to travel over Path 160. Robotic Lawnmower 110 may analyze and store its position and orientation several times a second, enabling it to later repeat Path 310 as laid out by the user.

In another embodiment, a user may Robotic Lawnmower 110 may use an algorithm to mow around a perimeter of an area to be mowed, and Robotic Lawnmower 110 may use an algorithm to determine how to mow an interior of the area. One skilled in the art will recognize that several different approaches may be used to determine an appropriate algorithm for mowing the interior of the area.

Figure 4:
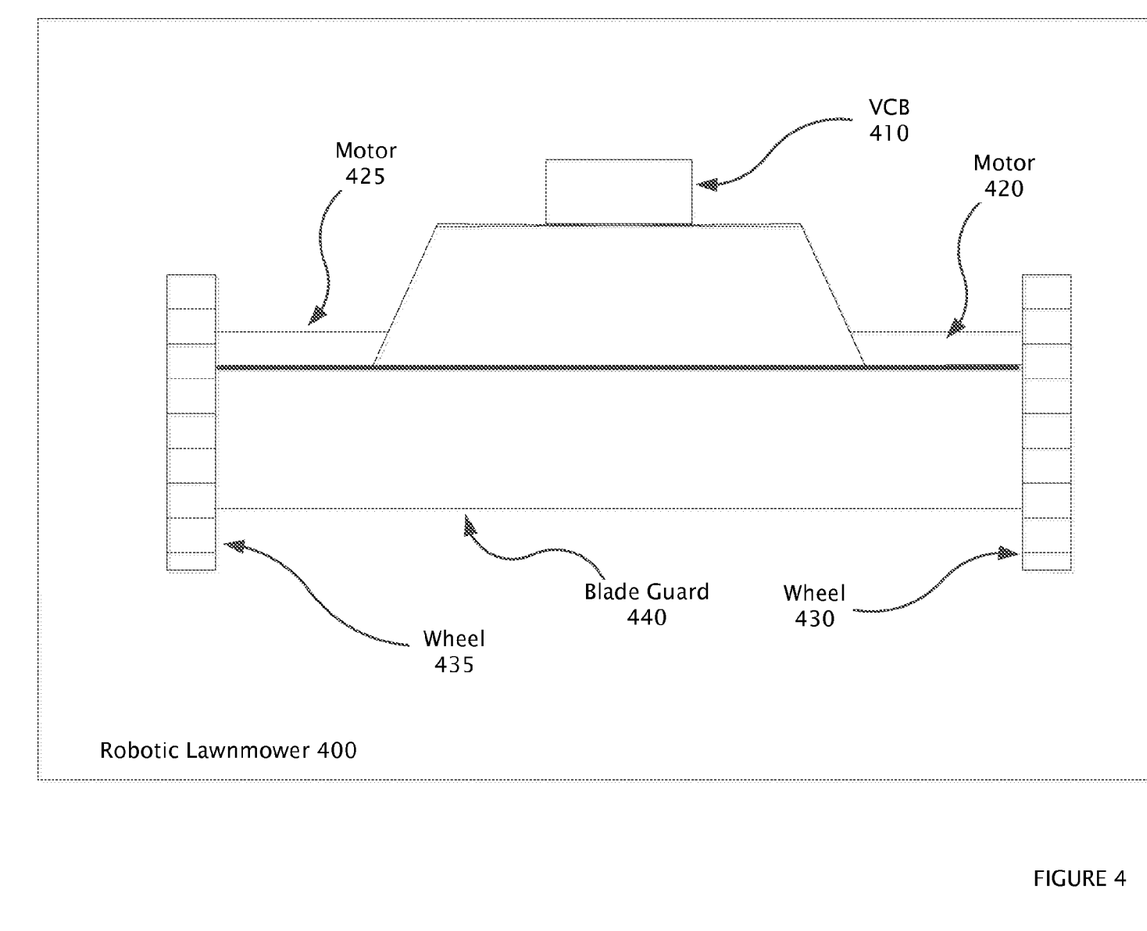
FIG. 4 is an example of a front view of a lawnmower according to one embodiment.

FIG. 4 is an example of a front view of a lawnmower according to one embodiment. Lawnmower 400 may be used to mow a lawn by navigating a learned path. In this example, a user may mow a lawn with Lawnmower 400 in a learning mode, during which Vision and Control Box (VCB) 410 records a path followed.

VCB 410 may include a single-or-omnidirectional camera, which may provide images to determine Robotic Lawnmower 400s location relative to existing environmental features. VCB 410 may also include a central processing unit (CPU) and memory to store and calculate a location based on the images.

Once the path is learned, Lawnmower 400 may repeat the path using Motors 420, 425 to independently turn Wheels 430, 435, which may allow Lawnmower 400 to turn as desired. VCB 410 may include outputs to control the motors.

This example uses a reel-type lawnmower blade, with Blade Guard 440 offering protection for objects not meant to be mowed. In another embodiment, a rotating blade may be used for mowing. In yet another embodiment, a scissors-type blade design may be used. One skilled in the art will recognize that different types of blades may be used for mowing grass.

In one embodiment, there may be a mechanism to raise and lower a cutting blade. In another embodiment, there may be a way to start and stop the blade from mowing; for example to allow for crossing over a stone path.

Figure 5:
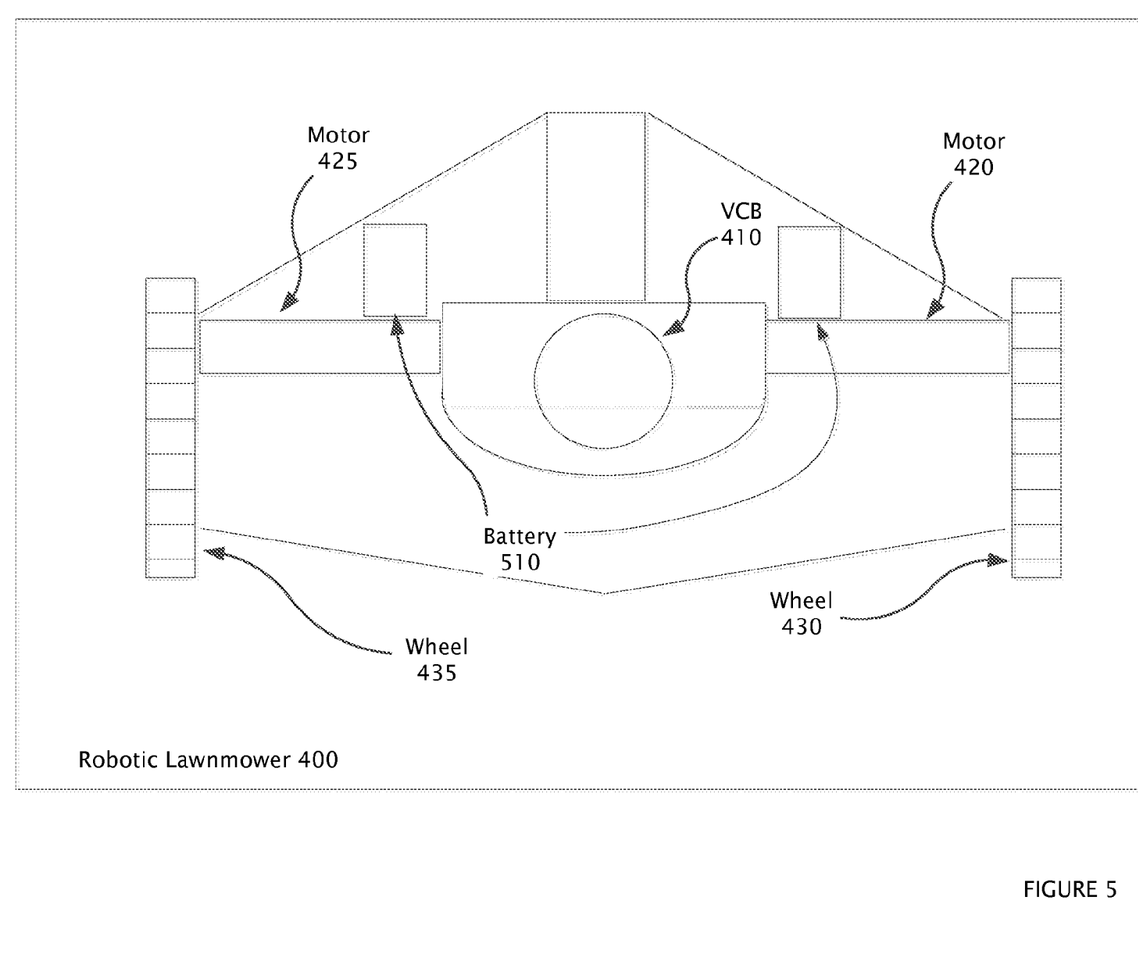
FIG. 5 is an example of a top view of a lawnmower according to one embodiment.

In other embodiments, other means of movement may be used in addition to or instead of wheels. For example, a lawnmower may use tracks FIG. 5 is an example of a top view of a lawnmower according to one embodiment. Batteries 510 may be used to power Motors 420, 425, as well as VCB 410. VCB 410 may also have a separate power supply available.

Figure 6:
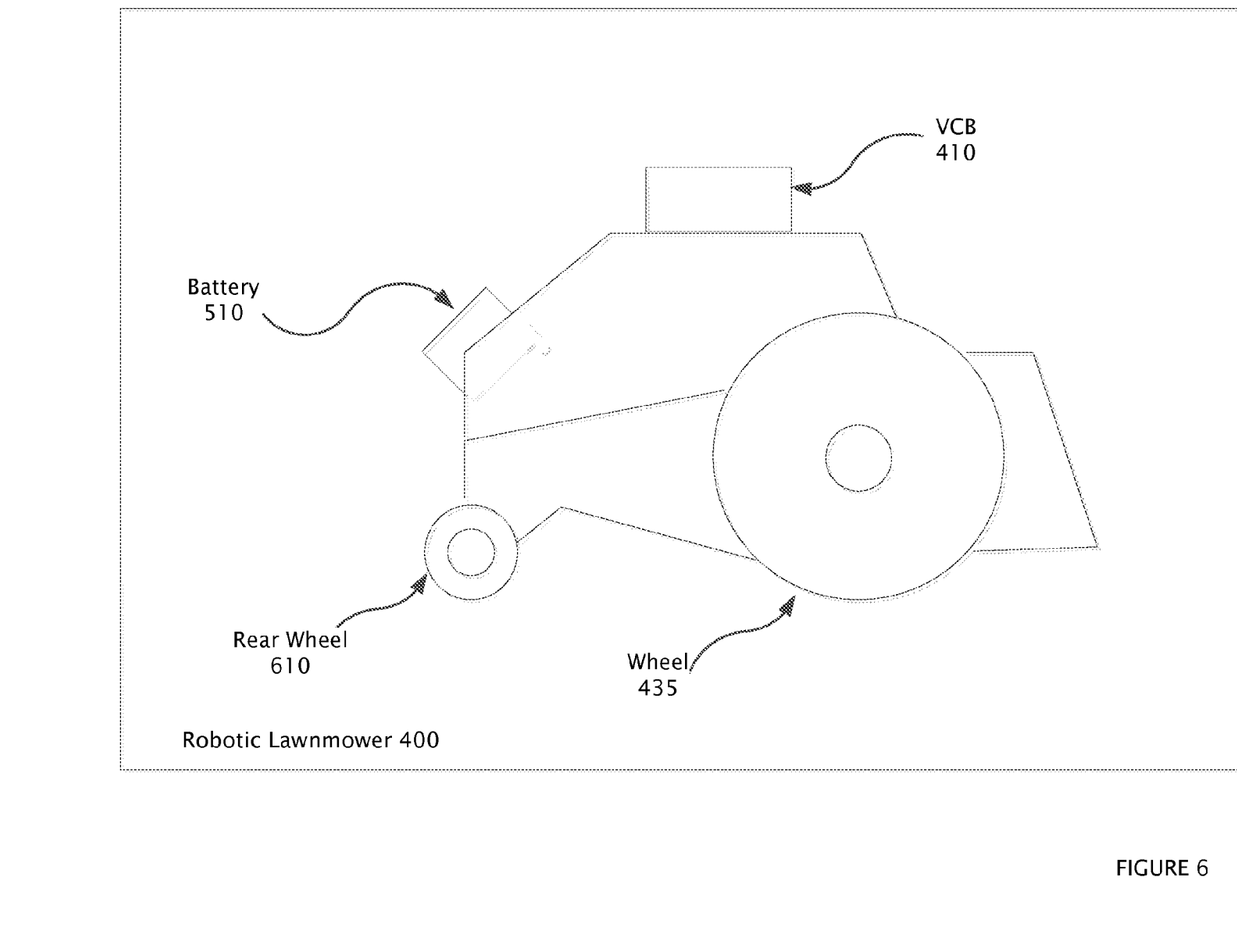
FIG. 6 is an example of a side view of a lawnmower according to one embodiment.

FIG. 6 is an example of a side view of a lawnmower according to one embodiment. Rear Wheel 610, which may be a freely-pivoting wheel, may provide support for Lawnmower 400.

One having skill in the art will recognize that other devices may use Path Recording and Navigation. In one embodiment, a device for skimming the top of a pool may use a propeller or oars to control movement. In another embodiment, a device may use Path Recording and Navigation to refinish floors, or other applications in a factory.

Figure 7:
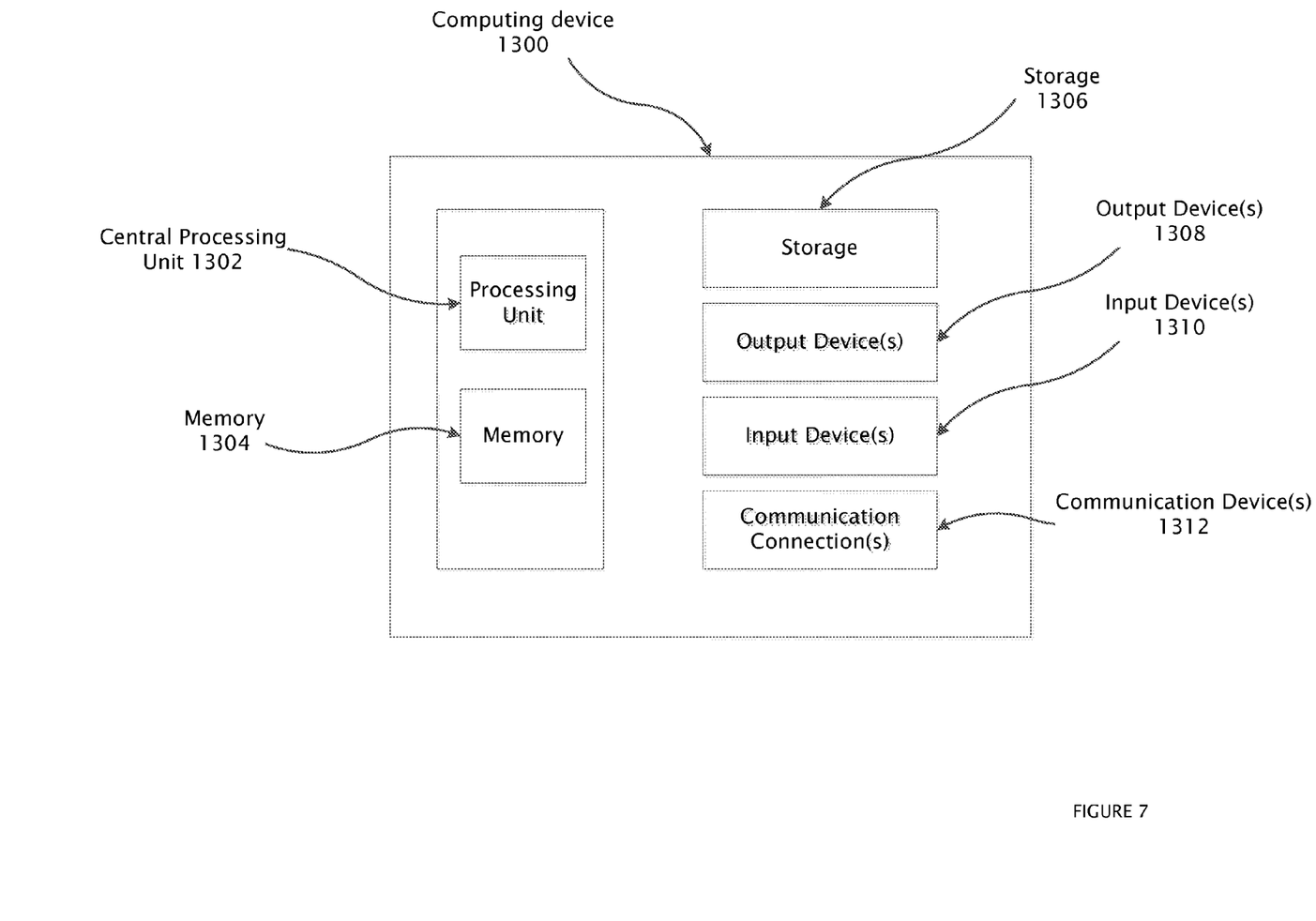
FIG. 7 illustrates a component diagram of a computing device according to one embodiment.

FIG. 7 illustrates a component diagram of a computing device according to one embodiment. The computing device (1300) can be utilized to implement one or more computing devices, computer processes, or software modules described herein. In one example, the computing device (1300) can be utilized to process calculations, execute instructions, receive and transmit digital signals, receive and transmit search queries, and hypertext, compile computer code as required by a Vision and Control Box (410). The computing device (1300) can be any general or special purpose computer now known or to become known capable of performing the steps and/or performing the functions described herein, either in software, hardware, firmware, or a combination thereof.

In its most basic configuration, computing device (1300) typically includes at least one central processing unit (CPU) (1302) and memory (1304). Depending on the exact configuration and type of computing device, memory (1304) may be volatile (such as RAM), non-volatile (such as ROM, flash memory, etc.) or some combination of the two. Additionally, computing device (1300) may also have additional features/functionality. For example, computing device (1300) may include multiple CPU's. The described methods may be executed in any manner by any processing unit in computing device (1300). For example, the described process may be executed by both multiple CPU's in parallel.

Figure 8:
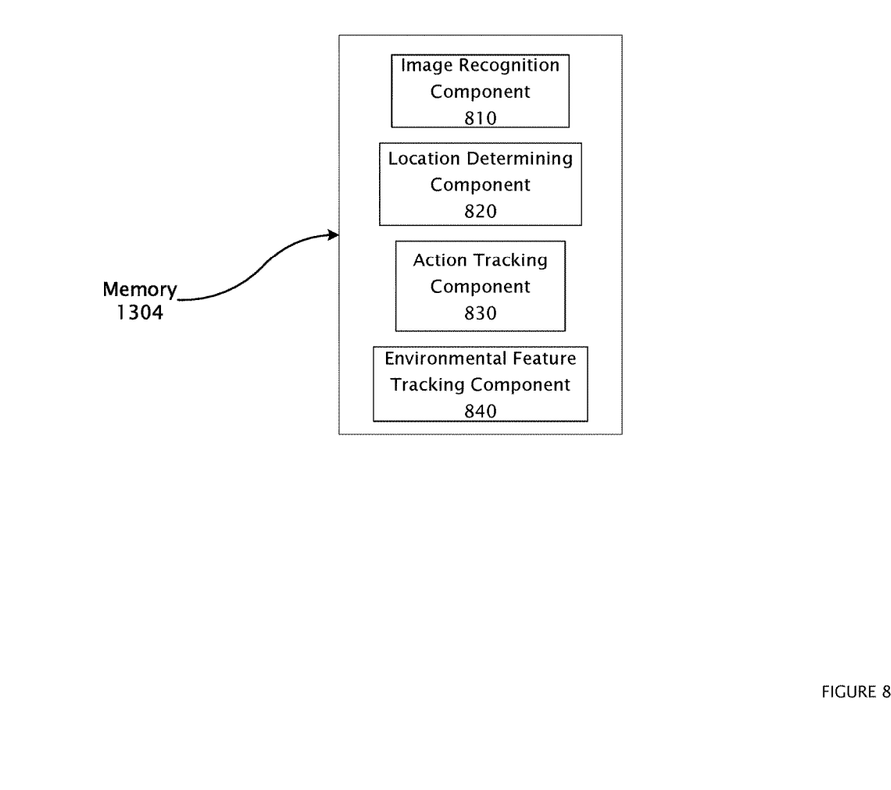
FIG. 8 illustrates that an image recognition component, a location determining component, an action tracking component, and an environmental feature tracking component may be disposed in a memory.

Computing device (1300) may also include additional storage (removable and/or non-removable) including, but not limited to, magnetic or optical disks or tape. Such additional storage is illustrated in FIG. 8 by storage (1306). Computer storage media includes volatile and nonvolatile, removable and non-removable media implemented in any method or technology for storage of information such as computer readable instructions, data structures, program modules or other data. Memory (1304) and storage (1306) are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device (1300). Any such computer storage media may be part of computing device (1300).

Computing device (1300) may also contain communications device(s) (1312) that allow the device to communicate with other devices. Communications device(s) (1312) is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device (1300) may also have input device(s) (1310) such as keyboard, mouse, pen, voice input device, touch input device, etc. Output device(s) (1308) such as a display, speakers, printer, etc. may also be included. All these devices are well known in the art and need not be discussed at length.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

FIG. 8 illustrates that Image Recognition Component 810, Location Determining Component 820, Action Tracking Component 830, and Environmental Feature Tracking Component 840 may be disposed in Memory 1304. One having skill in the art would recognize that these components may be disposed in memory or may be hardware components coupled with Computing Device 1300.

While the detailed description above has been expressed in terms of specific examples, those skilled in the art will appreciate that many other configurations could be used. Accordingly, it will be appreciated that various equivalent modifications of the above-described embodiments may be made without departing from the spirit and scope of the invention.

The invention claimed is:

1. A system, comprising:
   a processor;
   a memory coupled to the processor;
   a camera coupled to the processor;
   an image recognition component, configured to recognize an image obtained from the camera, the image containing at least one environmental feature;
   a location determining component, configured to determine a location relative to recognized image;
   an environmental feature selecting component, configured to select an environmental feature for future navigation by processing an image to evaluate if the environmental feature is suitable for navigating a navigation path;
   a navigation path storage component, configured to record a manually navigated navigation path, the recording comprising storing a plurality of images and determining a location relative to at least one environmental feature included in each of the images; and
   an action tracking component, configured to record an action associated with the determined location; a playback component, configured to reproduce the navigation path.

2. The system of claim 1, further comprising:
   a motor; and the playback component configured to control the motor to reproduce the navigation path.

3. The system of claim 1, wherein the camera comprises an omnidirectional camera.

4. The system of claim 1, wherein the camera comprises a wide angle lens.

5. The system of claim 1, wherein the system comprises a factory robot.

6. The system of claim 1, wherein the system comprises a lawnmower.

7. The system of claim 6, further comprising an activity selected from a group comprising engaging a cutting blade, disengaging a cutting blade, changing the cutting height of a cutting blade, beginning to distribute fertilizer, ceasing a distribution of fertilizer, beginning to water an area, and ending a watering of an area.

8. A method, comprising:
   manually navigating a path;
   recording the path by storing images of environmental features, at least one image selected by evaluating an environmental feature from the image and determining the environmental image is suitable for navigating on the path;
   receiving an image;
   comparing the image to the previously stored list of images to identify a location on the recorded path; and
   adjusting an input on at least one motor driving a means of propulsion to move the device along the recorded path.

9. The method of claim 8, wherein the image is received from a camera.

10. The method of claim 8, wherein the means of propulsion comprises a wheel.

11. The method of claim 8, wherein the means of propulsion comprises a track.

12. The method of claim 8, wherein the means of propulsion comprises a propeller.

13. A non-transitory computer readable storage medium containing instructions thereon which, when executed, perform a method comprising:
   navigating a path;
   recording the path by storing images of environmental features, at least one image selected by evaluating an environmental feature from the image and determining the environmental image is suitable for navigating on the path;
   receiving an image; and
   comparing the image to the stored images to identify a location on the recorded path;
   adjusting an input on at least one motor driving a means of propulsion to move the device along the recorded path.

14. The non-transitory computer readable storage medium of claim 13, wherein the image is received from a camera.

15. The non-transitory computer readable storage medium of claim 13, wherein the identifying a location comprises using at least one environmental feature.

16. The non-transitory computer readable storage medium of claim 13, wherein the means of propulsion comprises a wheel.

17. The non-transitory computer readable storage medium of claim 13, wherein the means of propulsion comprises a track.

18. The non-transitory computer readable storage medium of claim 13, wherein the means of propulsion comprises a propeller.

* * * * *